Dec. 30, 1952   H. KING   2,623,499
POULTRY NEST
Filed Nov. 16, 1948
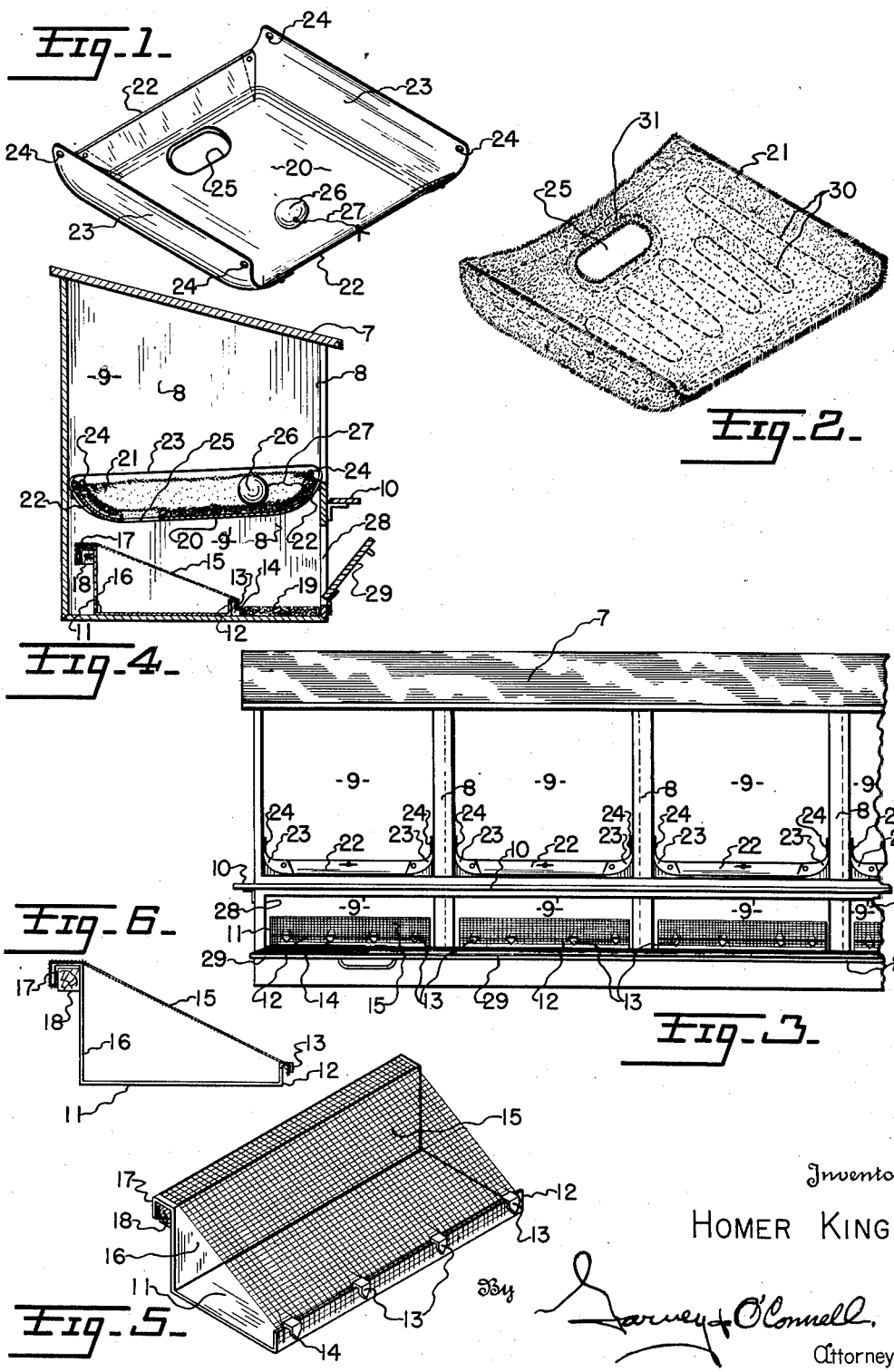
Inventor
HOMER KING.
By Harvey & O'Connell.
Attorneys.

Patented Dec. 30, 1952

2,623,499

UNITED STATES PATENT OFFICE 2,623,499

POULTRY NEST

Homer King, Orrville, Ohio

Application November 16, 1948, Serial No. 60,226

1 Claim. (Cl. 119—45)

The present invention comprises poultry nests being an improvement on the poultry nest of my copending application, Serial No. 793,799, filed December 26, 1947, now Patent No. 2,593,240, of which this is a continuation-in-part. Extensive experiments have proven that the manifold improvements of my previous invention are multiplied by the addition of a reticulate egg impinging bank for each nest and inclined downwardly toward a complemental pad, the bank and the pad being separately removable for cleaning, replacement, or the like.

It is a further object of this invention to provide parallely arranged nests each serviced by a perforate bank and a pad, each bank and pad being removable through an opening in the nest housing, the same opening also being used for removal of the trapped eggs from each nest.

Other objects of this invention are to provide an egg impinging bank which includes a reticulate fabric sheet which is readily removable, for cleaning or replacement, and readily reengaged with its base; to provide nest units a series of which is superposed over a recticulate egg impinging bank, each nest being made from a blank the sides of which are extended for securement to adjacent walls of the nest housing; to provide nests arranged in parallel batteries or series each composed of a plurality of divided separate nests with each nest in communication with an egg impinging bank; and to provide a nest housing provided with a plurality of separate nests and a plurality of complemental compartments, access being gained to the nest through a common opening and access being gained to the compartment through a separated opening in a wall of the housing, each nest being in communication with a compartment through an egg outlet opening, eggs being gathered from each compartment through its opening, the latter also serving as an ingress and egress opening for the reticulate egg impinging bank and its intercepting pad.

Other objects of this invention will be apparent from the following description of the present preferred form of the invention, wherein:

Figure 1 is a perspective view of an egg nest base constructed in accordance with this invention;

Figure 2 is a similar view of the sisal nest cushion;

Figure 3 is a fragmentary front elevational view of a nest housing embodying a battery or series of nests shown arranged above the reticulate egg impinging banks of the present invention observable through the opening in the front of the housing beneath the nests;

Figure 4 is a vertical sectional view of the nest housing taken on a vertical medial plane through one of the nests, showing the door in the front of the housing partly open;

Figure 5 is an enlarged perspective view of a reticulate egg impinging bank constructed in accordance with the present invention; and Figure 6 is an end elevational view of the same.

The device of the present invention comprises a poultry nest housing, generally designated 7, including a roof, side and end walls and a base. The housing is also equipped with a plurality of partitions 8 to provide separate nest compartments 9 and separate egg receiving compartments 9'. Ingress and egress to and from the nests is permitted through the front of the housing, access to the nests being facilitated by a bar 10 mounted on the front wall of the housing.

The floor of each of the compartments 9' carries a reticulate egg impinging bank 11 which includes a base preferably made of metal, the bottom of which may be of channel shape formation. One wall of the channel, designated 12, is provided with a plurality of lugs 13 each of which has its free terminal pointed, as indicated at 14, to facilitate engagement of a portion of a reticulate sheet or body 15 thereover. The reticulate sheet is preferably made of a fabric and extends upwardly from the top of the wall 12, as shown advantageously in Figures 5 and 6, to the top of the rear wall 16 of the base 11. The rear wall 16 is much higher than the wall 12 so as to dispose the reticulate sheet 15 at an inclination to permit the eggs deposited thereon to gravitate downwardly toward and over the upper margin of the front lower wall 12 of the base. The upper rear margin of each sheet 15 is preferably secured to the base by reversely folding the top of the wall 16 to provide an inverted U 17. Said rear margin of each sheet 15 is engaged over and in the inverted U 17, as shown in Figures 4, 5 and 6, following which a securing bar 18 is urged into the inverted U channel. The bar 18 may be made of wood or other inexpensive material and is of a width slightly in excess of the width of the inverted U 17. Consequently, when the bar is urged into the inverted U against the sheet 15, the aft free wall of the inverted U is flexed outwardly to positively clamp the sheet 15 from displacement. When it is desired to remove a sheet 15 for cleaning or replacement, the bar 18 is disengaged in an obvious manner and the sheet disengaged from the lugs 13.

Also mounted on the floor of the housing 7, just in front of each bank 11, is an egg intercepting pad or mat 19. The forward margin of the pad or mat is engaged with the inner face of the front of the housing 7. An egg deposited on a sheet 15 is permitted to gravitate downwardly from the latter into engagement with the pad or mat 19.

Each of the nest compartments 9 is adapted to receive a nest which is preferably formed of two parts one of which is a base, as indicated at 20, and the other a cushion 21 which conforms to the shape of and is adapted for engagement in the base 20 of the nest. Preferably the base 20 is stamped or otherwise formed from a single sheet of metal or other suitable material, opposite ends 22 thereof being curved upwardly to prevent fore and aft movement of the cushion 21 in the base. The base also includes sides 23 which extend upwardly beyond the upper margins of the ends 22 and are provided with openings 24 adjacent their corners, adapted for the reception of securing means which are engaged with the partitions 8 and/or the ends of the housing. The sides 23 prevent lateral displacement of the cushion 21 in an obvious manner, in addition to providing anchorage extensions for the nest base. As will be noted upon reference to Figure 4, each nest must be secured in the housing at an inclination so that as an egg is laid, it will gravitate toward complemental openings 25 formed in the base 20 and cushion 21. It is also preferred that a decoy egg 26 be employed, the egg being secured to a flexible cable 27 carried by the nest base 20.

In actual use the proximity of the nests to the reticulate egg impinging banks will be substantially as shown in Figure 4 of the drawing. It is, of course, necessary that the lower end of each nest be adjacent the top of its reticulate sheet 15. The eggs, after gravitating through the openings 25 of the nests, impinge the fabric reticulate sheets and while gravitating downwardly into engagement with the pad or mat 19, will complete a number of revolutions, thereby expediting dehydration of the shell surface before the egg actually contacts the pad. Eggs deposited on the pad 19 are removable through an opening 28 formed in the front of the housing, the opening being normally closed by a door 29. The opening 28 also serves as an ingress and egress opening for the banks 11 and the pads 19. It is to be understood that both the banks and the pads are loosely mounted on the bottom of the nest housing 8 but are of a size conforming substantially to the size of the interior of the housing to prevent displacement of either the banks or the pads.

Preferably the cushion 21 of the nest is formed from sisal which I have found from experience is far superior to excelsior or other materials heretofore used for padding or cushioning a hen's nest. The fibrous strands of the sisal are sewed or otherwise secured together, as indicated at 30. If desired, the cushion 21 may be reinforced around the opening 25, as indicated at 31.

It has been found that by use of the present invention, the trapped eggs are free from moisture and dirt and may be gathered quickly from a plurality of nests by opening a single door. Furthermore, with a nest of the present invention there is no possibility of incubation setting in before the eggs are removed from the nest housing in view of the fact that the egg gravitates from the nest almost immediately upon being laid. The opening 25 of the nest is, as in my previous application, of ovoid shape to prevent possibility of the egg passing through the opening endwise.

Although I have herein shown only a single battery or series of nests arranged in parallel relation, it is to be understood that the housings may be multiplied and arranged in superimposed relation.

It is to be understood that various changes may be made herein within the scope of the claim hereto appended.

I claim:

An egg impinging bank for poultry nest housings comprising a base of channel shaped formation in cross section and having opposed side walls of unequal height, pointed lugs on the upper edge of one of said side walls, the other of said side walls being provided at its upper edge with an inverted U-shaped channel, a reticulate sheet supported at an incline between said opposed side walls and having one of its longitudinal edges impaled on said pointed lugs and the other of its longitudinal edges disposed in said inverted U-shaped channel, and a securing bar engaging in said channel and clamping the mentioned edge of the sheet therein.

HOMER KING.

REFERENCES CITED

The following references are of record in the file of this patent:

UNITED STATES PATENTS

| Number | Name | Date |
|---|---|---|
| 820,952 | Bunsen | May 22, 1906 |
| 843,850 | Smidesang | Feb. 12, 1907 |
| 886,151 | Olson | Apr. 28, 1908 |
| 1,019,072 | Miller | Mar. 15, 1912 |
| 1,399,614 | Groves | Dec. 6, 1921 |
| 1,402,790 | Olson | Jan. 10, 1922 |
| 1,892,235 | Esch | Dec. 27, 1932 |
| 1,926,133 | Anderson | Sept. 12, 1933 |